INVENTOR.
HERBERT KARSH
BY Robert J. Schiller
ATTORNEYS

United States Patent Office 3,463,143
Patented Aug. 26, 1969

3,463,143
ECTOPIC BEAT DETECTOR
Herbert Karsh, Lexington, Mass., assignor to Lexington Instrument Corporation, Waltham, Mass., a corporation of Massachusetts
Filed Nov. 23, 1966, Ser. No. 596,493
Int. Cl. A61b 5/04
U.S. Cl. 128—2.06                                    7 Claims

ABSTRACT OF THE DISCLOSURE

An ectopic beat detector employing a beat-by-beat detector circuit which provides a step change in signal amplitude responsively to a change in the repetition rate of an input train of pulses. The step changes in the signal are differentiated to provide signal spikes, the amplitude of which is proportional to the change in repetition rate of the pulse train. Only spikes exceeding a threshold magnitude due to approximate doubling of the pulse train repetition rate are used then to trigger a flip-flop to generate enabling signals applied to a gate. The latter is connected to pass the input train only when so enabled. Gate output thus occurs only when ectopic beats occur in the pulse train.

---

This invention relates to electrocardiology and more particulary to novel apparatus for electrically detecting the occurrence of ectopic heart beats.

Ectopic heart beats are frequently symptomatic of serious cardiac difficulties. They are often difficult to detect, particularly in cases where the ectopic beat occurs infrequently. However, by continuous aural monitoring over a period of time during which such beats can be expected to occur, they can be detected but require uninterrupted attention and observation of an attending physician or technician.

The present invention is intended to free individuals from the function of continuous monitoring and provide indication of ectopic beats.

Devices providing automatic, continuous, electrical indication of potentials corresponding to heart functions are common, such as the well-known electrocardiographs and a number of cardiotachometers. Prolonged electrocardiography with moving tapes is rarely feasible unless a detailed examination of the electrocardiographic wave form is desired. For the limited purpose of monitoring the heart rate, cardiotachometers are generally used and are generally of two types, either the socalled "beat-by-beat" detector or the averaging cardiotachometer.

The beat-by-beat detector is generally based upon a system whereby a charge storage device provides voltage levels corresponding respectively to the interval between the two immediately preceding heart beats detected. The level of charge or potential is then sampled at fixed intervals after each beat, and that level displayed.

If the heart beat rate is constant, of course, the sampling will continue to exhibit substantially the same potential and the detector will stay at a fixed level. A change in the heart rate will result in a step change in the indicator level inasmuch as the beat-by-beat detector ignores any measurement more remote than that interval between the two last heart beats. As the usual heart beat rate is rarely precisely constant, the output of this type of detector is usually a series of small up and down level changes and it is difficult to distinguish an ectopic beat from these small irregularities in pulse spacing.

An averaging detector is based upon the principle that the energy output for each heart beat is substantially constant and therefore the device generates a series of pulses corresponding in time to the heart beats, each pulse having a fixed energy constant. The energy of the pulses is averaged in time as by passing them through a leaky RC circuit, thereby providing an output signal in which the average rate is weighted to give the most significance to the most recent measurement of rate, and the least significance to the most remote rate measured, the difference in the significance varying exponentially. Thus, changes in the heart beat rate will be reflected by ramps in the detector output. The response of an averaging detector to an abrupt change in a pulse rate, as from an ectopic beat, is seriously damped by the necessary high time constant of the averaging circuit.

Because the beat-by-beat detector yields an "instantaneous" heart rate, it was originally developed for detection of cardiac reactions to emotional stimuli. It has since served additional purposes inasmuch as it clearly displays heart jitter or short term rate irregularities which are clinically significant and is also used to detect fetal heart distress during birth.

A principal object of the present invention is to provide electronic instrumentation particularly adapted for continuous monitoring of heart beat rates so as to detect and count ectopic beats.

Yet another object of the present invention is to provide a cardiotachometer which, as long as any changes in the pulse rate remains substantially constant in time, continues to provide a constant signal, yet when an abrupt change in pulse rate occurs, as from ectopic beats, gives a positive indication of that change.

Another object of the present invention is to provide apparatus for providing both an indication of a heart rate and a count of ectopic beats, as based upon an input consisting of a train of heart beat pulses.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
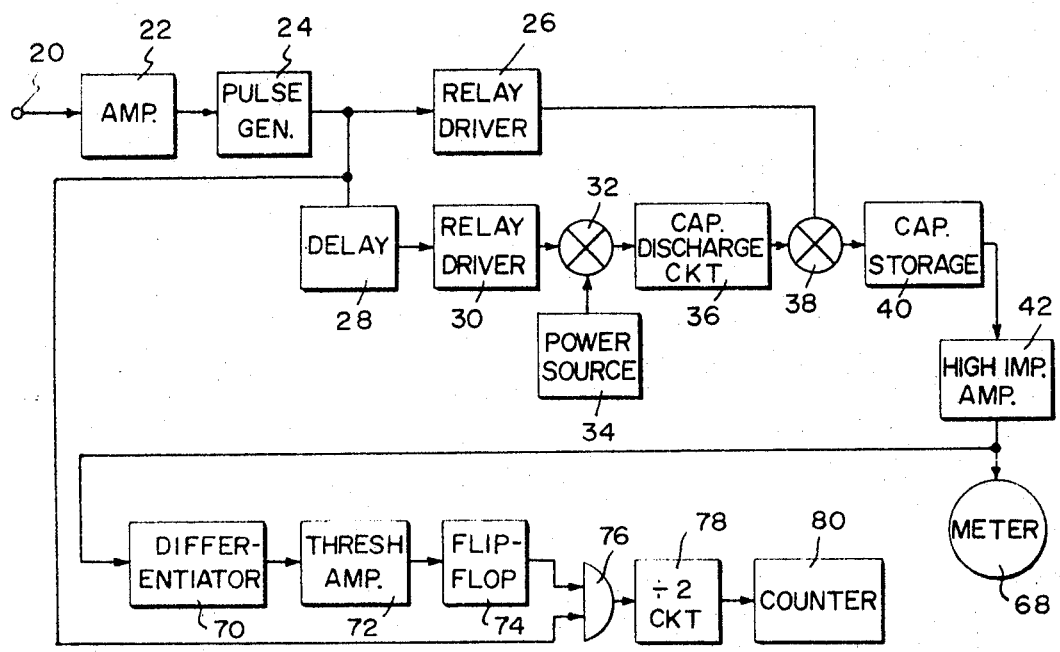
FIG. 1 is a block diagram showing the elements of a novel circuit for providing all three types of output signals.

Referring now to FIG. 1, there is shown an embodiment of the present invention comprising input terminal 20 at which an electrical signal in the form of a pulse train indicative of a heart beat (such as is obtained by electrocardiographic electrode) is intended to be applied. Preferably, input terminal 20 is connected to amplifier 22 for increasing the amplitude of the signals. Amplifier 22 is conveniently a high input impedance amplifier which is also frequency selective so as to filter out interfering high frequency noise.

The output of amplifier 22 is connected to pulse generator 24 which provides, responsively to the input pulses above a given level, a series of uniform, i.e., cleaned-up, pulses each of fixed amplitude and duration, and abrupt rise and fall times. Typically, the pulse generator can be a Schmitt trigger circuit or an overdriven amplifier normally biased off (class C).

The output of pulse generator 24 is connected to both the input end of first relay driver amplifier 26 and the input of delay line 28. The latter typically can be any of a number of known devices such as the well-known magnetostrictive delay line. The output of the delay line is connected to the input of second relay driver amplifier 30.

The invention includes first relay-controlled switch means 32 having the usual input and output terminals. Switch means 32 is coupled to driver amplifier 30 so as to be operable by a signal from the latter for selectively connecting the switch input and output terminals together. Connected to the input terminal of switch means 32 is DC power source 34 whilst connected to the output terminal of switch means 32 is the input side of capacitor discharge circuit 36.

Also included is second, relay-controlled switch means 38 having input and output terminals, and being coupled to the output of driver amplifier 26 so as to be operable by a signal from amplifier 26 for selectively electrically connecting those terminals together. The input terminal of switch means 38 is connected to the output of discharge circuit 36. The output terminal of switch means 38 is connected to the input of capacitive storage means 40. The output of storage means 40 in turn is connected to the input of high input impedance amplifier 42.

Figure 3:
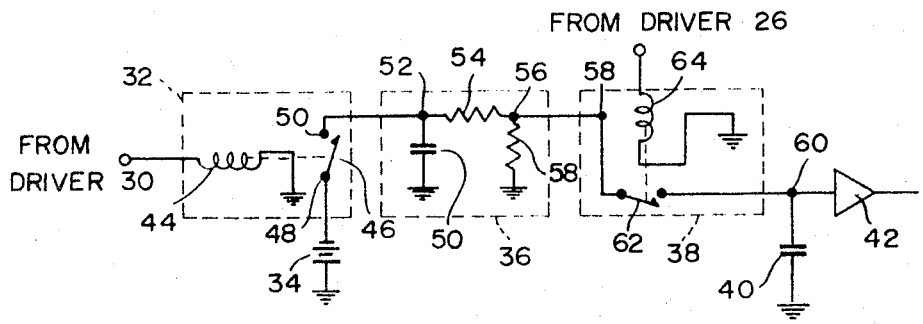
FIG. 3 is a detailed schematic circuit diagram of a portion of the embodiment of FIG. 1.

Referring now to FIG. 3 there will be seen an exemplary circuit schematic of a number of elements of FIG. 1 in somewhat more detail. Switch means 32 includes relay coil 44, one side of which is connected to the output from relay driver 30, and the other side of which is grounded. Coil 44 is magnetically couplable to switch armature 46 which is thereby movable to open or close a circuit between input terminal 48 and output terminal 50. Power source 34, shown as a battery, is connected between input terminal 48 of switch means 32 and ground. Capacitive discharge circuit 36 comprises capacitor 50 connected between ground and input terminal 52. The latter is, of course, connected to output terminal 50 of switch means 32. The capacitive discharge circuit also includes resistor 54 connected in series between input terminal 50 and output terminal 56, and also preferably includes another resistor 58 connected between ground and output terminal 56.

Second switch means 38 includes input terminal 58 and output terminal 60 selectively connectable or disconnectable by moveable conductive switch armature 62, the latter being magnetically coupled so as to be moved by relay coil 64. Coil 64 is connected between the output of driver 26 and ground. Capacitor storage device 40 is shown simply as a capacitor connected between output terminal 60 and ground. Output terminal 60 is shown connected to the input of high impedance amplifier 42.

The device as thus described will be recognized by those skilled in the art to substantially meet the requirements for a beat-by-beat cardiotachometer and operate in the following manner.

Figure 2:
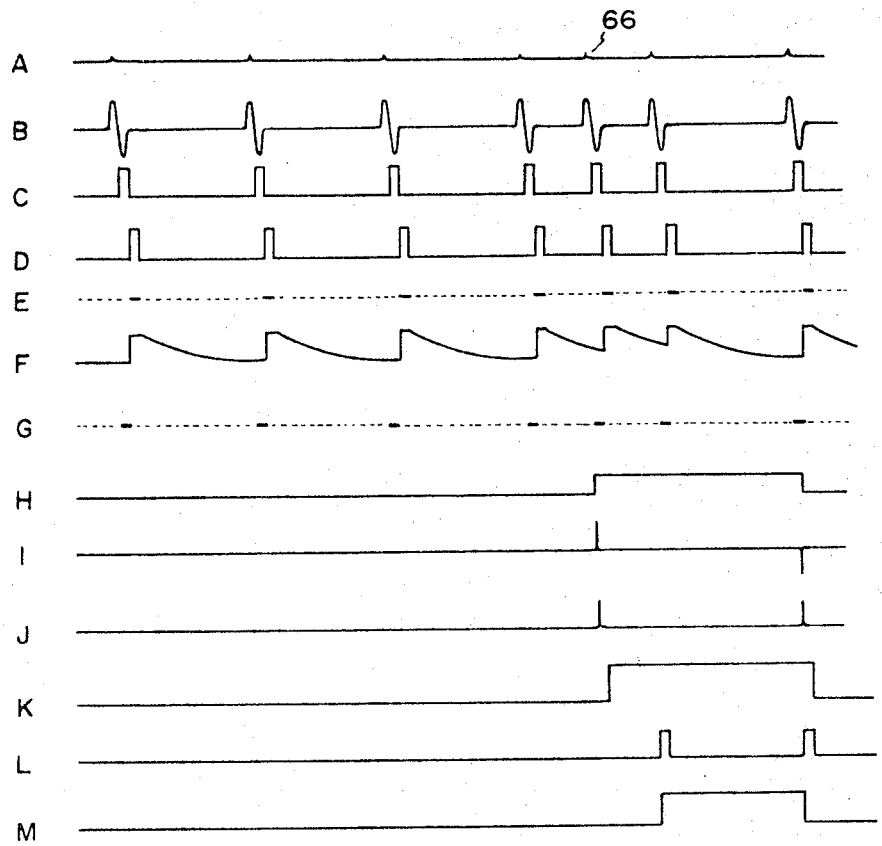
FIG. 2 is a timing diagram showing exemplary, idealized waveforms occurring at various points in the diagram of FIG. 1.

In operation, a pulse train is introduced at terminal 20 such as is shown in FIG. 2 at A. The pulses are idealized forms of the R wave of the usual electrocardiographic waveform, an ectopic beat being shown at 66 interposed between two regular heart beat pulses. These pulses are passed through amplifier 22, emerging with greater amplitude such as is shown in B of FIG. 2, the pulse time spacing remaining unchanged. Because these pulses are usually not appropriate to serve as timing triggers (e.g. the amplitude frequently varies widely from pulse to pulse) it is preferred to further process or shape the pulse train. Hence, the amplifier output is shaped, as in generator 24 emerging as rectangular pulses of substantially constant amplitude and short fixed duration as shown in FIG. 2C. The pulses from generator 24 are applied both to relay driver 26 and to delay line 28. The pulses from generator 24 are delayed by delay line 28 to provide the waveform shown in FIG. 2D, so that the delayed pulses based upon the original pulse train of FIG. 2A, occur just later than the occurrence of the decay transition of the pulses from generator 24. In other words, each pulse of FIG. 2C is complete just before a corresponding pulse emerges from delay line 28. The pulses as shown in the drawing have been exaggerated in duration for the sake of clarity and, of course, are preferably much shorter.

Thus, the pulses from the delay line are amplified in amplifier-driver 30 and operate switching means 32 by actuating relay coil 44 to close armature 46 for a series of brief intervals shown as solid lines in the otherwise broken line of FIG. 2E. At each such interval battery 34 provides a potential which is applied to capacitor 50 to charge the latter very rapidly. When armature 46 returns to its normally open position, the charge on capacitor 50 decays with a time constant set by the RC values of circuit 36. Hence, a series of decay curves are presented to switching means 38 as is shown in FIG. 2F, each starting at a time delayed slightly following the occurrence of an original heart beat pulse. However, switching means 38 is operated by the rectangular pulses from amplifier-driver 26 applied to relay coil 64 to close armature 62 from its normally open position for a series of brief intervals shown as solid dashes in FIG. 2G. Each closure of armature 62 therefore samples the potential at terminal 58 for a predetermined interval expiring just prior to recharging of capacitor 50. This sample level is stored in capacitor 40 which is comparatively nonleaky due to the high impedances provided by switch 38 when open and by amplifier 42. Hence, the input to the latter is a step-function, as shown in FIG. 2H wherein the signal level is quite stable and varies abruptly only when the pulse to pulse interval or the repetition rate changes, as shown by the presence of ectopic beat 66. The output of amplifier 42 is connectable to meter 68 which therefore can indicate the "instantaneous" heart beat rate. As previously noted, it is difficult to distinguish a single ectopic beat and small variations in pulse to pulse timing, and even more difficult then to distinguish between only a single ectopic beat or a number of ectopic beats occuring within a very short period of time. Because there is clinical significance to the "frequency" or number of ectopic beats that occur, the present invention also includes means for sharply distinguishing ectopic beats and for counting the number of such ectopic beats that occur, the present invention also includes means for sharply distinguishing ectopic beats and for counting the number of such ectopic beats discovered.

To this end, referring again to FIG. 1, the output of amplifier 42 is also connected to the input of differentiator circuit 70, typically a passive RC circuit or an operational amplifier with a capacitive input impedance and a resistive feedback, in order to differentiate the transitions of the signal appearing at the amplifier output. The output of circuit 70 is connected to the input of thresholding amplifier 72. Thresholding amplifiers, well known in the art, are intended to produce an output signal only when the amplitude of the input signal exceeds a predetermined level or threshold. The output of amplifier 72 is connected to a common trigger input terminal of a bistable multivibrator or flip-flop 74. The latter characteristically has a pair of output terminals and provides two mutually exclusive signals respectively on these terminals. When triggered, the state of the signals abruptly changes and remains in the changed condition until changed by a second trigger signal which again reverses the state of the signals. One output terminal of flip-flop 74 is connected to an enabling input terminal of two-input terminal AND gate 76. Typically, the latter can be a pair of diodes connected and arranged so that an output signal appears only if and when both diodes are energized by appropriate input signals. The other enabling input terminal of gate 76 is connected to the output of pulse generator 24.

Connected to the output of gate 76 is divide-by-two circuit 78, for example another flip-flop, which provides at an output one pulse for every two pulses applied at its input. The output of circuit 78 is connected to indicator means, preferably in the form of pulse counter 80, a known device for counting pulses in a decimal mode.

If the rate of heart beat being monitored changes abruptly, for example, from 80 p.p.m. to 85 p.p.m., the change will be reflected by a step change in the output of amplifier 42. This step change, of the type normally expected will be of small amplitude compared to the step change produced by an ectopic beat, because the transition amplitude is proportional to the absolute value of the change in pulse interval. Clearly, the occurrence of the ectopic beat constitutes a momentary effective doubling of the pulse rate and will provide a comparatively large step change. As shown in FIG. 2I, differentiator 70, responsive to each step change in the output of amplifier 42, provides a derivative of the amplifier signal in the form of an output spike, the magnitude of which is proportional to the step change. Thresholding amplifier 72 is set so that the spike due to ordinary expected step changes in the signal output of amplifier 42, cannot provide an output signal, but only spikes of the magnitude provided by ectopic beats can trigger amplifier 72. The latter is also preferably of the absolute value type of amplifier so that it responds with an output signal of only one polarity regardless of the polarity of input signals thereto.

Thus, when an ectopic beat occurs, amplifier 72 produces an output signal responsively to the rise transition of the step change in the signal from amplifier 42. If there is but a single ectopic beat, the signal from amplifier 42 produces a second or decay transition corresponding to the return of the heart beat pulse rate to "normal." Hence, each ectopic beat tends to create two successive spikes in the output signal of differentiator 70 and thus of amplifier 72. If a plurality of ectopic beats occurs, each spaced from the next by a single regular heart beat, the signal at output of amplifier 42 will show an abrupt rise transition, but will remain at an elevated magnitude of longer duration than the signal due to a single ectopic beat. In such case, there are still only two spikes in the signal from amplifier 72 as shown in FIG. 2J.

It will be seen that the initial spike, caused by an ectopic beat, in the output signal from amplifier 72 is applied to flip-flop 74. This triggers the latter causing an abrupt change of state of its output signal as shown in FIG. 2K. This signal from flip-flop 74 applied to gate 76 serves to enable the latter so that any pulses arriving at the other gate input terminal provide a corresponding output signal from the gate. Preferably flip-flop 74 has a slight delay in its output so that the flip-flop signal rises and decays a short interval after the flip-flop is triggered by the output of amplifier 72. Obviously, this delay can be provided by other means such as a delay line in circuit between the output of amplifiers 42 and the gate. Thus, the gate will pass for a single ectopic beat, two pulses, one arising from the ectopic beat and the next derived from the regular heart beat next following as illustrated in FIG. 2L. It will be apparent that $h$ ectopic beats will result in $2h$ pulses being transmitted by gate 76. Thus as shown in FIG. 2M the output of the latter is divided by 2 by circuit 78 and the resulting number $h$ is registered by counter 80.

Other objects of the invention will in part be obvious and will in part appear hereinafter. The invention accordingly comprises the apparatus possessing the construction, combination of elements, and arangement of parts which are exemplified in the following detailed disclosure, and the scope of the application of which will be indicated in the claims.

What is claimed is:

1. Apparatus responsive to a train of heart beat pulses, said apparatus comprising:
   a beat-by-beat detector for producing responsively to said train an output signal the amplitude of which exhibits abrupt transistions proportional to changes in the time interval between only the last few pulses of said train;
   means for differentiating said output signal for producing output spikes, each of amplitude proportional to the magnitude of a corresponding transition in said signal; and
   means for detecting only those spikes having an amplitude due to an abrupt approximate doubling of said pulse rate.

2. Apparatus as defined in claim 1 wherein said means for detecting said spikes comprises:
   thresholding means connected to the output of said differentiating means for transmitting only spikes above a predetermined amplitude, a gate having a first input terminal connected so as to be activated responsively to said train of pulses;
   means responsive to the output of said thresholding means for providing an enabling signal responsively to a first of said spikes and for terminating said enabling signal responsively to the next of said spikes, and having its output connected to another input terminal of said gate for enabling the later according to said enabling signal; and
   divider means for providing a signal output having only one-half as many pulses as are transmitted by said gate when the latter is enabled.

3. Apparatus as defined in claim 2 including means for counting the number of pulses in the output signal from said divider means.

4. Apparatus as defined in claim 2 wherein said thresholding means is an absolute value amplifier.

5. Apparatus as defined in claim 2 wherein said means responsive to the output of said thresholding means is a first bistable multivibrator and said divider means is a second bistable multivibrator.

6. Apparatus as defined in claim 2 including means for delaying the enablement of said gate by said enabling signal until at least the termination of the pulse of said train corresponding to the transition causing said enabling signal to be provided.

7. Apparatus as defined in claim 2 including generator means for producing a second train of shaped pulses corresponding to said train of pulses, said beat-by-beat detector and said first input terminal of said gate being connected to the output of said generator means.

References Cited

UNITED STATES PATENTS

| 2,492,617 | 12/1949 | Boland et al. | 128—2.06 |
| 3,267,934 | 8/1966 | Thornton | 128—2.06 |
| 3,352,300 | 11/1967 | Rose | 128—2.06 |

WILLIAM E. KAMM, Primary Examiner